July 5, 1932.  C. C. WORTHINGTON  1,865,993
LAWN MOWER
Filed Oct. 24, 1928
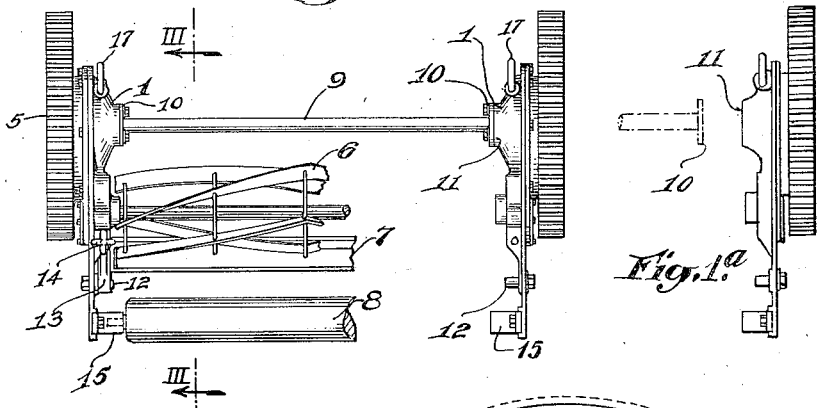
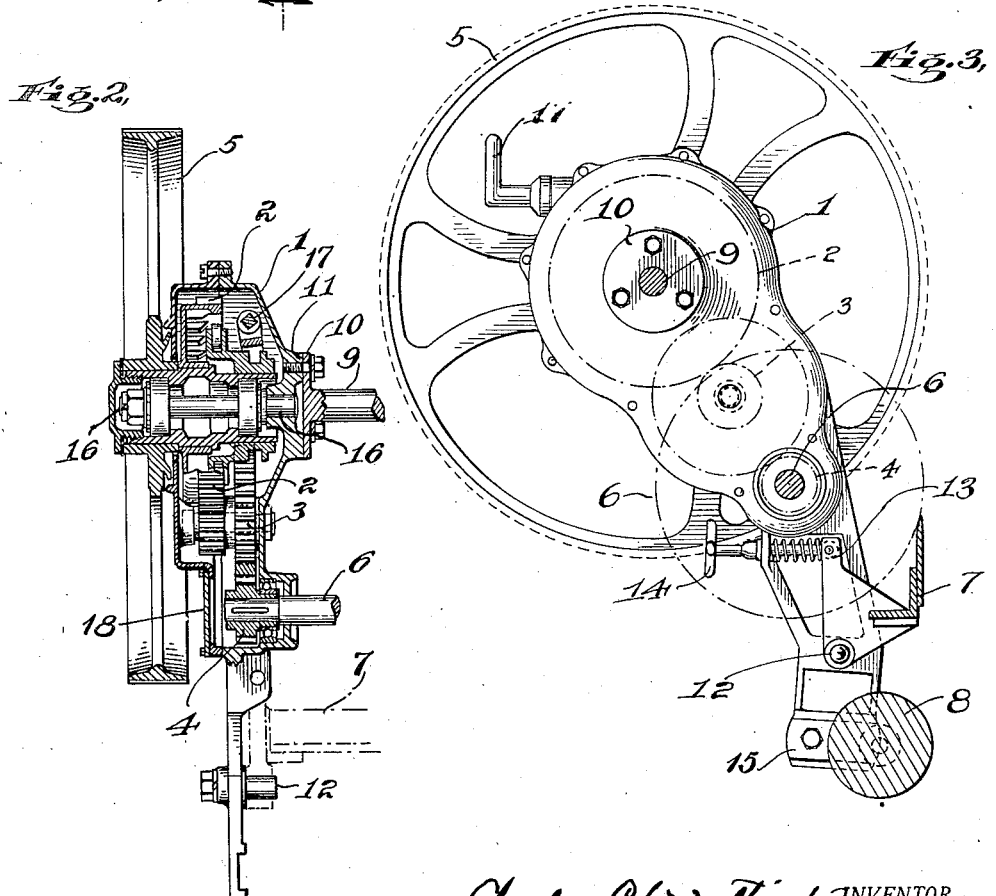
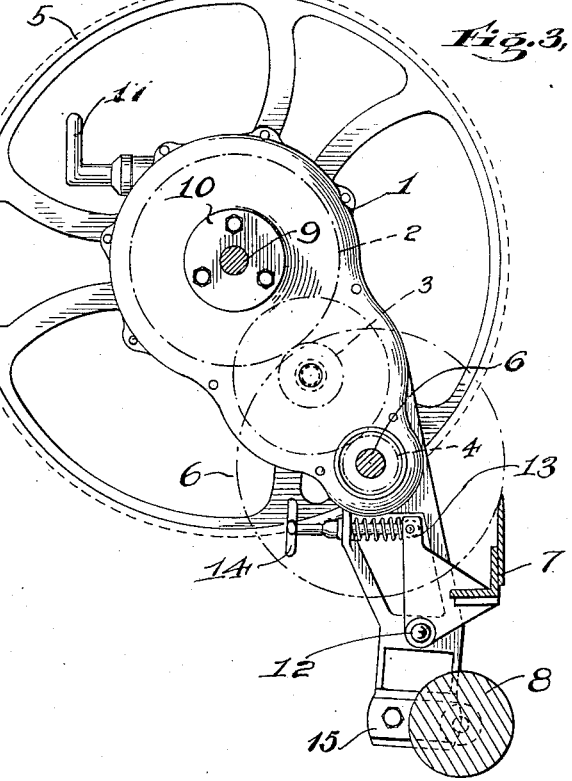
Charles C. Worthington INVENTOR.
BY
Jeffry Minter & Weston ATTORNEYS.

Patented July 5, 1932

1,865,993

UNITED STATES PATENT OFFICE

CHARLES C. WORTHINGTON, OF DUNFIELD, NEW JERSEY

LAWN MOWER

Application filed October 24, 1928. Serial No. 314,554.

The invention concerns the improvement of the frame-structure of lawn mowers, the objects being to simplify their manufacture and repair, to increase their durability and to provide also other advantages, including improved facilities for the removal of the cutter mechanism, as below pointed out.

In the accompanying drawing, Fig. 1 shows in broken plan a lawn mower incorporating the invention, Fig. 1a shows in diagram the cross frame member separated from the adjacent side casing.

Fig. 2 a section through one of the side members thereof, and

Fig. 3 a section on line III—III of Fig. 1.

The mower comprises the two usual side members 1, each of which contains the journal stud of one of the ground wheel and one or both of which is constituted as a casing for housing the usual gear-train, composed of gears 2, 3 and 4, through which the ground wheel 5 drives the fly knife 6. The detail of the gear-train is of no consequence to the invention and it may be of any suitable speed-multiplying design. Ordinarily and preferably there is one such train in each casing so that the fly knife is drivable at both ends. The casing is formed of two united parts attached by screws and arranged to hold a body of oil for lubricating the journals or parts inside of it; the ledger knife 7 and the rear rolling means or wiper roller 8, are located as usual, but so far as this invention is concerned the roller 8 or its equivalent could be placed in front of the fly knife and the ground wheels in rear, if desired.

The new mower frame is constituted of these two side casings and a single cross member 9, which rigidly connects their forward ends, being preferably located in the space between them and in the line of the axis of the two ground wheels, though not necessarily limited to this exact location. This cross member is conveniently formed by a round steel rod, or it might be a tube, having integral terminal enlargements or flanges 10 by which it is secured, by bolts or studs, directly to the proximate vertical faces of the side casings. The faces of the flanges are dressed off flat and square to the axis of the rod and the side walls of the casings are similarly dressed off flat and parallel to their longitudinal axes to take the flanges 10, which thus hold the two side casings together and exactly parallel. It is found that a solid cross rod of about the dimension shown and having end surfaces of adequate area as shown, suffices to secure the two casings more rigidly and with a greater permanence of rigidity than has been heretofore secured in lawn mowers by the usual methods of connection. The rear ends of the side casings may be entirely devoid of uniting cross frame structure notwithstanding these mowers are intended for use in power-drawn gangs where the operating strains are severe. It will be seen that the attachment bolts for the flanges 10 are accessible from outside of the side casings.

While the ledger knife structure might be made and utilized as a cross-brace part of the mower frame, to increase its rigidity, this additional bracing is not needed for the frame described, and accordingly such knife can be designed and mounted wholly with reference to its convenient and accurate adjustment to the fly knife and so that it can be quickly removed for grinding and without the complication that would be necessary if it were depended on for frame reinforcement. In consequence, the ledger knife in the present case is mounted for pivotal adjustment on two short studs 12 each bolted or otherwise rigidly fixed on the rear end of a side member projecting inwardly therefrom; it does not unite these studs or tie the side members together except as incident to its pivotal mounting. For adjustment, it is provided at its ends with forward arms 13 engaged with spring-locked adjustment screws 14 mounted in the side members, by which means it may be raised and lowered in adjustment to the fly knife.

The roller 8, or whatever type of rolling element is used, is mounted in the ends of the side members by means of the usual adjustable journal brackets 15 and this also has no necessary tying or bracing effect on the frame.

The journal stud 16 on which the ground wheel 5 and the main gear 2 of each casing are journalled is pressed or otherwise permanently fixed or upset in the side wall 11 of the casing and while it is preferably in line with the cross rod 9, it is wholly independent of it, being virtually an integral and interior part of the gear casing. The gear 2 on this stud is provided with the usual over-running ratchet drive as will be seen in the drawing and with a ratchet release device marked 17, but not concerned with this invention.

By unbolting either flange 10 from its adjacent side casing the latter can be bodily removed, as indicated in dotted lines Fig. 1, and on such removal the fly and ledger knives, also the wiper roller, become released and removable without requiring the disassembly of the whole of the drive mechanism as heretofore commonly necessary; that is to say, the fly knife pinion 4 can be slipped off of its key on the fly knife shaft, or if it is preferred to pin or fasten this pinion on its shaft, (as by means of a cotter pin or lock nut not shown in the drawing) an access hole with a screwed-on cover plate 18 is provided in the casing wall adjacent the pinion, as shown in Fig. 2. Such a plate can be easily opened to permit the pin or nut to be reached for release. Removing the side casing withdraws the stud 12 from the end of the ledger knife, (its adjuster screw having been first loosened) and also withdraws the bracket 15 from the gudgeon of the roller, thus dropping this member. It is not necessary that the casing be opened, further than indicated, or that the ground wheel be removed from its normal position and even though, in a modified design, it might be necessary to remove the wheel or perhaps the cover part of the casing, the journal-stud 16, gear train and ratchet drive need not be disturbed and the operation will be quickly performed in any event.

In power-drawn gang lawn mowers the cross member 9 may constitute the part by which the mower is connected to the gang framework, but the attachment means are not shown in the drawing since they may be variously applied and when the mower is intended for hand use the handle may be affixed to the side casings in the customary manner.

Claims:

1. In a lawn mower, a frame comprising two closed side casings each containing fixed within it a journal stud for its appurtenant ground wheel and one or both containing speed-multiplying gearing through which the latter drives the fly knife, in combination with a cross-rod secured by its ends to said casings in line with but independently of said journal studs.

2. In a lawn mower, a frame comprising two closed side casings each containing a ground wheel journal stud and one or both containing speed-multiplying gearing for driving the fly knife, a cross frame member having its ends enlarged and dressed off flat and square to the axis of said member and means for securing such ends to the proximate faces of said side casings.

3. In a lawn mower, a mower frame consisting of two closed side casings each containing a fixed journal stud for its ground wheel, and a fly knife gear train, a cross rod having terminal flanges providing end surfaces therefor of at least twice the diameter of said rod, means for rigidly and detachably securing such ends to the proximate faces of the casings, said means being accessible outside of the casing.

4. In a lawn mower, a mower frame comprising two side casings each containing a ground wheel journal stud, a cross rod having flanged ends rigidly bolted to the proximate faces of said casings and constituting the sole cross structure of said frame, and fly and ledger knives pivotally carried by said casings, and endwise removable therefrom on unbolting said cross rod.

5. In a lawn mower, a frame comprising two closed side casings each containing fixed within it a journal stud for its appurtenant ground wheel and one or both containing speed-multiplying gearing through which the latter drives the fly knife, in combination with a cross-rod in line with but independent of said journal studs and having flanged ends rigidly bolted to the proximate faces of said casings.

In testimony whereof, I have signed this specification.

CHAS. C. WORTHINGTON.